No. 781,847. PATENTED FEB. 7, 1905.
M. PEDERSEN.
CENTRIFUGAL CREAM SEPARATOR.
APPLICATION FILED OCT. 19, 1903.
3 SHEETS—SHEET 1.
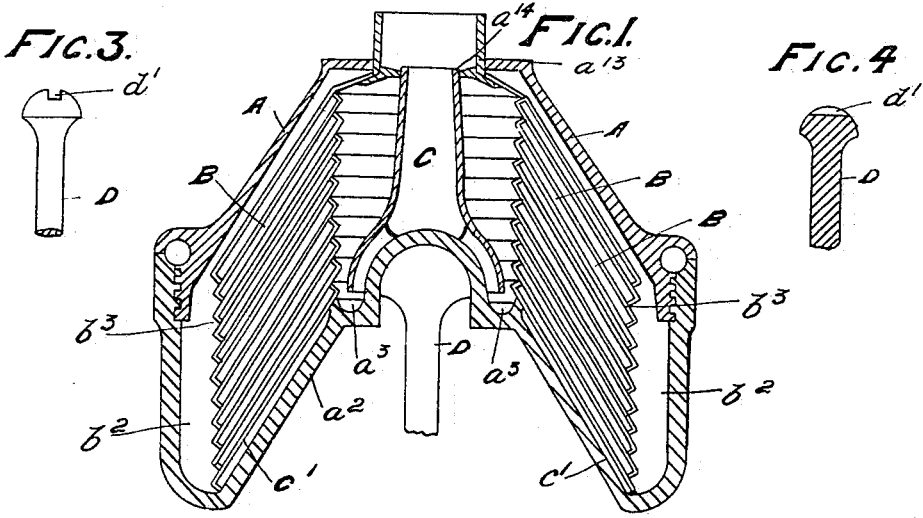
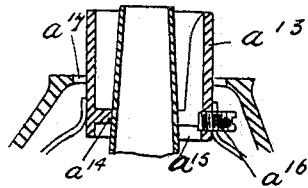
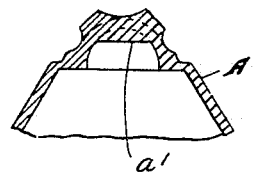
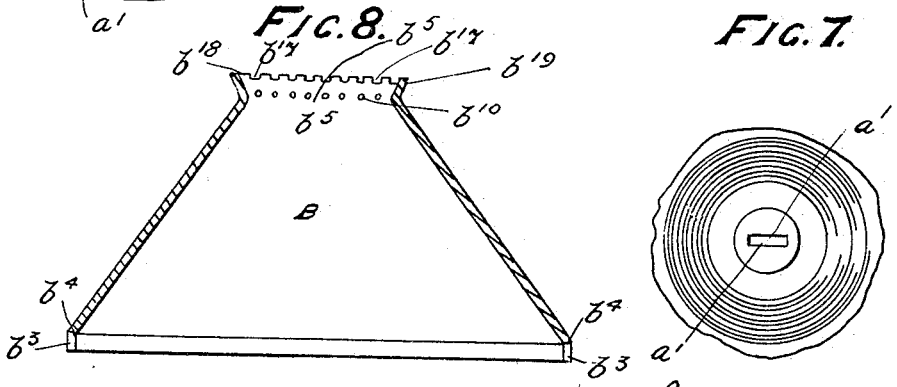
Witnesses:
David Moore.
J. N. Wright.
Inventor
Michael Pedersen
by C. H. Riches
Atty.

No. 781,847. PATENTED FEB. 7, 1905.
M. PEDERSEN.
CENTRIFUGAL CREAM SEPARATOR.
APPLICATION FILED OCT. 19, 1903.
3 SHEETS—SHEET 2.
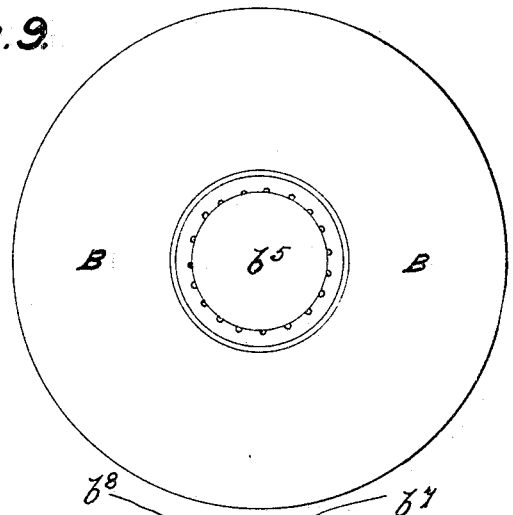
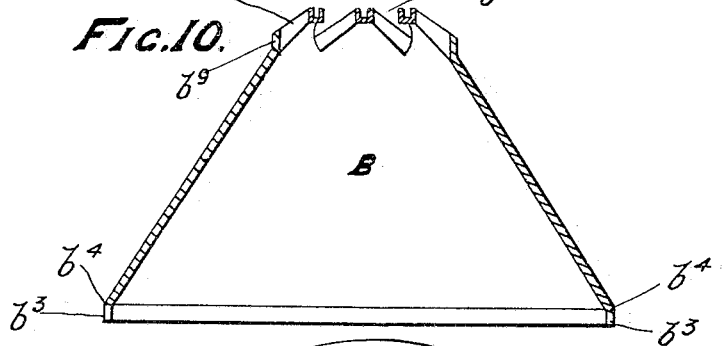
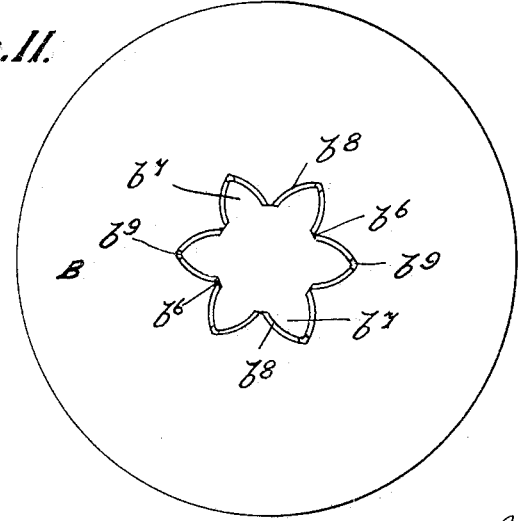

No. 781,847. PATENTED FEB. 7, 1905.
M. PEDERSEN.
CENTRIFUGAL CREAM SEPARATOR.
APPLICATION FILED OCT. 19, 1903.

3 SHEETS—SHEET 3.

No. 781,847.                                               Patented February 7, 1905.

UNITED STATES PATENT OFFICE.

MIKAEL PEDERSEN, OF DURSLEY, ENGLAND.

CENTRIFUGAL CREAM-SEPARATOR.

SPECIFICATION forming part of Letters Patent No. 781,847, dated February 7, 1905.

Application filed October 19, 1903. Serial No. 177,701.

*To all whom it may concern:*

Be it known that I, MIKAEL PEDERSEN, engineer, a subject of the King of Great Britain, and a resident of Raglan House, Dursley, in the county of Gloucester, England, have invented certain new and useful Improvements in Cream-Separators, (for which I have applied for a patent in Great Britain, No. 21,770, dated October 7, 1902,) of which the following is a specification.

My invention relates to improvements in cream-separators, and has for its object a means to increase the working capacity of such machines.

In order that this invention may be clearly understood and more easily carried into practice, I have appended hereunto three sheets of drawings, upon which I have illustrated the nature of my said invention.

Figure 12:
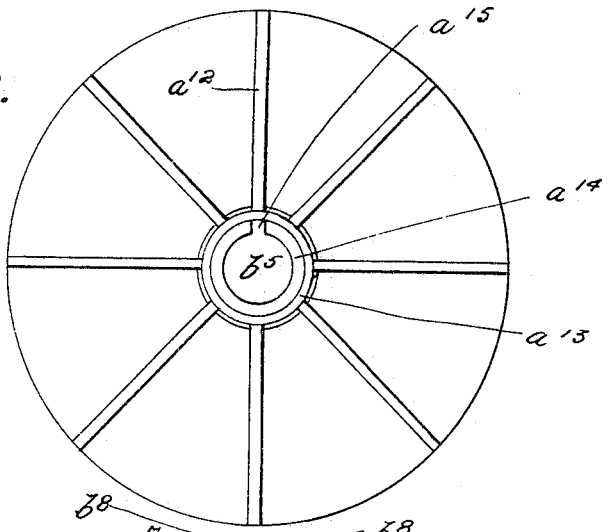
Figure 13:
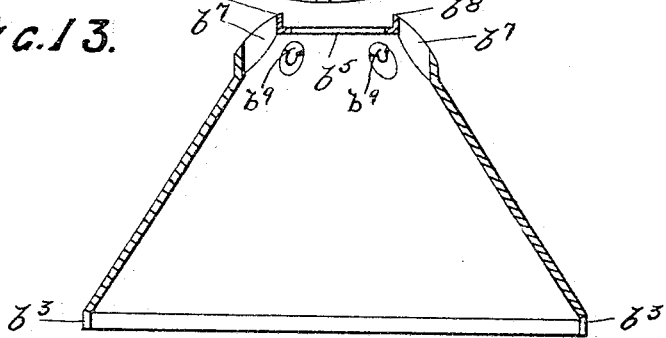
Figure 14:
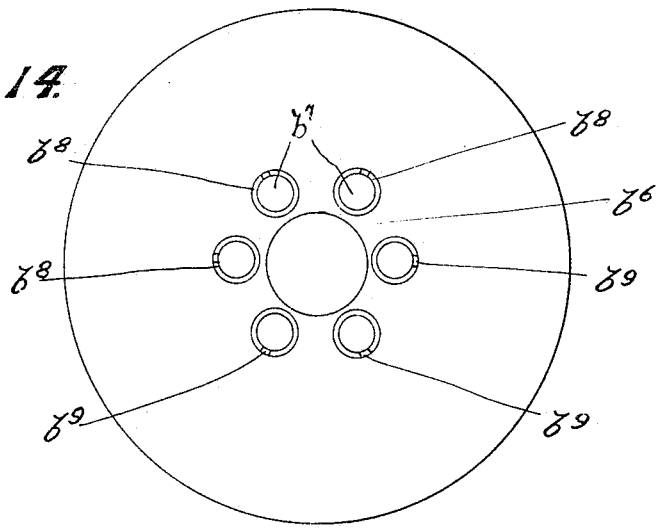

Figure 1 is a vertical section through the separator. Fig. 2 is a plan of Fig. 1. Fig. 3 is a side elevation of the spindle for supporting the bowl. Fig. 4 is a vertical section through Fig. 3. Fig. 5 is a plan of Fig. 3. Fig. 6 is a section of the bearing part of bowl. Fig. 7 is an inverted plan of Fig. 6. Fig. 8 is a section of one form of plate when detached. Fig. 9 is a plan of Fig. 8. Fig. 10 is a similar section to Fig. 8, but showing a modification. Fig. 11 is a plan of Fig. 10. Fig. 12 is a plan of the top plate. Fig. 13 is also a similar section to Fig. 8, but showing a modification. Fig. 14 is a plan of Fig. 13. Fig. 15 is a part similar section to Fig. 1, but showing the regulating-screw.

According to my invention a bowl or drum A is preferably mounted loosely on the ball-shaped top of a spindle D in such a manner as to allow of a perfect balance when rotating at high speed. To prevent the bowl or drum from slipping on the ball-shaped top of the spindle a slot or groove $d'$ is formed across the top of the said spindle, while a corresponding projection $d'$ in the seat of the bowl fits into the said slot or groove; but in some cases it may be preferable to fix the bowl A upon the spindle D. The neck-bearing (not shown) of the spindle D may be held in an elastic or spring bearing to take up the vibration, while in some cases the bowl A may be suspended from the spindle.

The revolving bowl or drum A, which is preferably made in two pieces with means for securing the two parts together, is provided with a series of circular conically-shaped plates B, placed concentrically one over another, space $b^2$ being allowed between their outer edges and the bowl A to allow for the skim-milk to pass upward and slimy or solid matters to collect.

In order to strengthen the plates B and also as a means for keeping them at the desired distance apart, the outer edges are preferably flanged or bent at $b^3$, Fig. 10, and small openings $b^4$ are arranged around the edges in order that the skimmed milk will pass therethrough. The centers $b^5$ of the plates are cut away and may have their edges curved inward, so as to strengthen the inner part of the plates and at the same time assist in preventing the cream from clogging. At a little distance from the inner edge of each plate a series of perforations $b^7$, Figs. 13 and 14, may be formed, the edges of which are raised at $b^8$, so that they project toward the next plate, which they may retain at the desired distance. The raised edges thus form channels or grooves $b^6$ for the cream to pass toward the center, thereby preventing it from mixing with the milk flowing through the above-mentioned perforations. Sufficient space $b^9$ is left between the raised edges of one series of perforations and the next plate for the new milk to pass. Instead of perforations having raised edges to form channels for the cream to pass toward the center the center opening $b^5$ may be formed in the conical plates B in the manner illustrated by Figs. 10 and 11, so that the parts $b^6$ are carried nearer the center than the other or intermediate parts, the edges being raised or flanged, as before described, so that the parts pointing toward the center will form channels projecting through the layer of new milk through which the cream can pass toward the center and through the layer of new milk without mixing therewith.

The new milk enters at C and passes between the conical plates B, spreading itself over or along the inner or hollow sides of the plates, while the cream, which travels along the outer side of the conical plates, will not pass over the raised edges $b^8$, but is guided along the said edges to the channels $b^6$, pointing toward the center and formed by the raised edges $b^8$.

In the modification illustrated by Figs. 8 and 9 the center opening in the conical plates is circular, the edges $b^9$ being bent outwardly or raised against the next plate and provided with holes $b^{10}$ for the cream to pass, and recesses $b^{17}$ in the edges forming spaces $b^{18}$ for the new milk to enter, or vice versa, the recesses $b^{17}$ and spaces $b^{18}$ being preferably placed alternatively.

By placing the circular conical plates with perforations, or the parts farthest away from the center, over one another space is formed for the inflowing milk to be equally distributed between all the plates and all over each plate.

The bottom $a^2$ of the bowl or drum is preferably conically formed, rising toward the center to fit into the circular conical plates and is reduced in size near the center, so as to allow of a circular space $a^3$, while one or more projections are arranged in such circular space for the purpose of causing the new milk which enters through the inverted funnel or tube C to revolve with the bowl. From the circular space $a^3$ the milk passes through the perforations $b^7$ in the nearest conical plate corresponding with the perforations in conical plates over it, or if the second-described conical plates are used then the perforations will correspond with the parts of the inward edges of the said plates which are farthest from the center. In the modifications Figs. 8 and 9 the inlet-funnel may terminate near the bottom of the circular space, leaving space for the inflowing milk to pass through. It will be seen that the milk upon entering in this way can pass upward without disturbing the cream on its way toward the center, thereby enabling the milk to find its way to the spaces between the conical plates throughout the bowl or drum. In cases where the modification shown by Figs. 8 and 9 is used the cream passes in drops toward the center through the new milk.

The top conical plate B, having no perforations, is held at a distance from the top of the bowl or drum by radial distance-pieces $a^{12}$, Figs. 12 and 15, thus allowing space for the separated milk to pass, and also carries from its center opening and upward a ring or neck $a^{13}$, which has a circular projection or edge $a^{14}$ pointing toward the center and which is cut away in one or more places at $a^{15}$ to allow for the cream to pass, a screw $a^{16}$ or other suitable arrangement being employed for regulating the said space or spaces. The said ring or neck projects through the neck-opening of the bowl A, which is provided with a circular edge pointing toward the center, which edge is cut away at $a^{17}$ in one or more places to allow for the skim-milk to pass.

The separated liquids after leaving the bowl may be collected in two circular trays placed one over another, from which trays it is led through spouts or tubes. The unseparated liquids may be led to center of the bowl through a tube or the like.

The bowl may be mounted upside down without interfering with the above-described arrangements, except that the inlet may be arranged in the center of what I have described as the "bottom" of the bowl.

Having now described my invention, what I claim as new, and desire to secure by Letters Patent, is—

1. In a cream-separator, the combination of a rotating bowl or drum, and a series of conical plates mounted in said rotating bowl or drum having their outer edges flanged and perforated, substantially as set forth.

2. In a cream-separator, the combination of a rotating bowl or drum, and a series of conical plates mounted in said bowl or drum and having their central channels bent outward with recesses and perforations arranged around the center.

3. In a cream-separator, the combination of a rotating bowl or drum, and a series of conical plates mounted in said bowl or drum having their centers cut away to form alternate recesses and spaces, said conical plates being provided with flanged and perforated outer edges.

4. In a cream-separator, the combination of a rotating bowl or drum, and a series of conical plates mounted in said bowl or drum having a central opening and perforations therearound, said conical plates also being provided with perforated lower edges.

In witness whereof I have hereunto set my hand in the presence of two witnesses.

MIKAEL PEDERSEN.

Witnesses:
 WALTER H. E. BARTLAM,
 LEWIS W. GOOLD.